United States Patent [19]

Kuwahara

[11] Patent Number: 4,946,192
[45] Date of Patent: Aug. 7, 1990

[54] KNEE PROTECTOR

[75] Inventor: Takanori Kuwahara, Kanagawa, Japan

[73] Assignee: Nissan Motor Company, Limited, Japan

[21] Appl. No.: 288,173

[22] Filed: Dec. 22, 1988

[30] Foreign Application Priority Data

Dec. 25, 1987 [JP] Japan .................. 62-195938[U]

[51] Int. Cl.$^5$ ............................................. B60R 21/04
[52] U.S. Cl. .................................... 280/751; 280/777
[58] Field of Search ............... 280/777, 779, 780, 748, 280/751, 752

[56] References Cited

U.S. PATENT DOCUMENTS 4,297,911 11/1981 Grahn et al. ...................... 280/777

FOREIGN PATENT DOCUMENTS 53-30219  8/1978 Japan .
54-32445  3/1979 Japan .
57-47554  3/1982 Japan .
58-150552 10/1983 Japan .

Primary Examiner—Kenneth R. Rice
Attorney, Agent, or Firm—Lowe, Price, LeBlanc, Becker & Shur

[57] ABSTRACT

A knee protector is used in an automotive vehicle equipped with an instrument panel and a steering column which detaches from a mounting portion so as to absorb energy applied to a steering wheel connected to the steering column. The knee protector is arranged within the instrument panel at a location neighboring the steering column and is fixed to the instrument panel. The knee protector has a pair of ribs which extend in a direction essentially perpendicular to the axis of the steering column. The ribs project from one surface of the knee protector and are recessed in the other surface thereof. The ribs serve to reinforce the knee protector and to make deformation of the knee protector easy when a load is applied to the steering wheel in the direction of the axis of the steering column. The knee protector is made of a material which is deformed to absorb impact energy when impact force is applied to the knee protector body.

3 Claims, 2 Drawing Sheets

# KNEE PROTECTOR

BACKGROUND OF THE INVENTION

1. Field of the Invention

The present invention relates generally to a knee protector for use in an automotive vehicle. More specifically, the invention relates to a knee protector which protects knees of the driver of the vehicle if the vehicle is abruptly decelerated due to a collision.

2. Description of the Prior Art

When an automotive vehicle collides with an object in an accident, although the upper half of the body of the driver is restrained by means of a seat belt and shoulder harness, the driver's knees may violently strike against the column cover and so forth. In order to protect the driver's knees in such an accident, various knee protecting arrangements have been proposed. Some of such knee protecting arrangements are described in the Japanese Utility-Model First (unexamined) Publication (Jikkai Sho.) Nos. 54-32445 and 57-47554, and the Japanese Patent Second (examined) Publication (Tokko Sho.) No. 53-30219.

In the disclosed knee protecting arrangements, a deformable knee protector member is provided under a steering column in front of the driver's knees. When the knees strike against the knee protector member in a car crash, the knee protector member is deformed to absorb kinetic energy due to the crask so that the load applied to the driver's knees is restricted to be within a predetermined allowable limit.

In automotive vehicles in which the occupant's hip point is relatively low, the driver's knees are located in a relatively forward position as compared with vehicles in which the hip point is relatively high. In such vehicles, if the knee protecting arrangement occupies too much space under the steering column, the space under the steering column for the driver's legs may be too small. Therefore, the knee protecting arrangement must be so arranged as to assure a sufficiently amount space under the steering column.

In some vehicles, an energy absorbing steering column is provided in which when a load is applied to the steering wheel, break away mounting brackets for mounting the steering wheel on the steering column prevent injury to the driver due to shock transmitted through the steering wheel. In such vehicles, if the knee protecting arrangement is to close to the steering column, the break away mounting brackets tend to interfere with the knee protecting arrangement.

SUMMARY OF THE INVENTION

It is therefore a principal object of the present invention to eliminate the aforementioned disadvantage and to provide a knee protector arrangement which can assure smooth detachment of a detachable steering column and sufficient space between the driver's knees and the knee protector member.

In order to accomplish the aforementioned and other specific objects, a knee protector arrangement according to the present invention includes a knee protector body which is arranged within an instrument panel at a location neighboring a steering column and is fixed to the instrument panel. The knee protector arrangement also includes means for reinforcing the knee protector body and for making deformation of the knee protector body easy when a load is applied to a steering wheel connected to the steering column in the direction of the axis of the steering column.

According to one aspect of the present invention, a knee protector for use in an automotive vehicle equipped with an instrument panel and a steering column which detaches from a mounting portion so as to absorb energy applied to a steering wheel, comprises:

a knee protector body which is arranged within the instrument panel at a location neighboring the steering column and is fixed to the instrument panel; and means for reinforcing the knee protector body and for making deformation of the knee protector body easy when a load is applied to the steering wheel in the direction of the axis of the steering column.

The means may comprise a plurality of recessed portions formed in one surface of the knee protector body, the recessed portions projecting from the opposite surface of the knee protector body and extending in a direction essentially perpendicular to the steering column. The knee protector body is preferably made of a material which is deformed to absorb impact energy when impact force is applied to the knee protectory body.

DESCRIPTION OF THE PREFERRED EMBODIMENT

Figure 1:
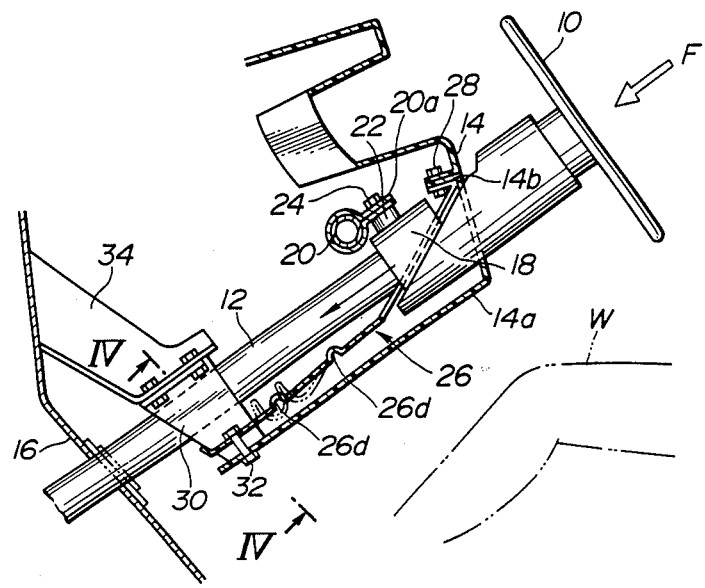
FIG. 1 is a schematic view illustrating attachment of a knee protector according to the present invention.
Figure 2:
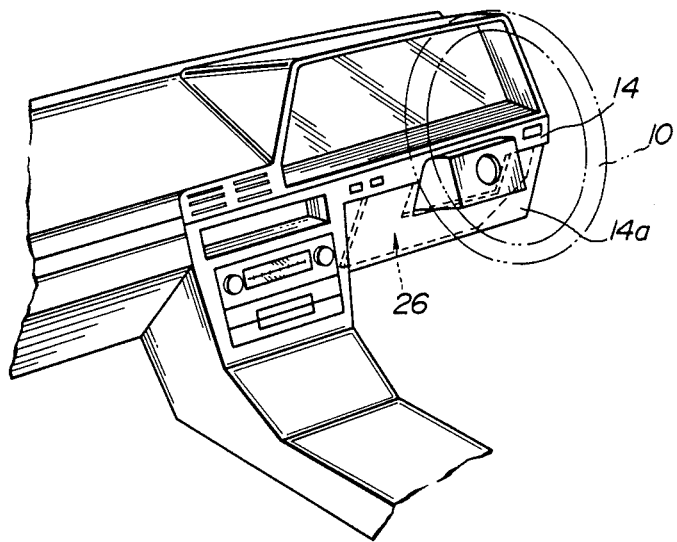
FIG. 2 is a perspective view of an instrument panel in which the knee protector of FIG. 1 is provided.

Referring now to the drawings, particularly to FIGS. 1 and 2, there are illustrated a preferred embodiment of a knee protector according to the present invention.

A steering wheel 10 is connected to one end of a steering column 12, the other end of which passes through an instrument panel 14 and a lower panel 16 to be in communication with a steering gear not shown. The steering column 12 is supported on a mounting bracket 18 in a location neighboring the upper end thereof. The mounting bracket 18 is arranged on a mounting portion 20a of a steering member 20 via a spacer 22 functioning as a fuse, and is fixed thereto by means of a bolt 24. As is well known, when more than a predetermined load is applied to the steering wheel 10, the steering column 12 moves in a longitudinal direction and the mounting bracket 18 breaks away from the mounting portion 20a of the support member 20, that the energy applied to the steering wheel 10 is absorbed.

The support member 20 extends in the lateral directions of the vehicular body, and is fixed to a pair of support stays (not shown) to be supported thereon.

The instrument panel 14 has a lower panel 14a which extends essentially in parallel to the steering column 12. A knee protector 26 is arranged between the steering column 12 and the lower panel 14a of the instrument panel 14. The knee protector 26 is made of material which can be deformed due to impact force applied thereto so as to absorb the impact energy.

Figure 3:
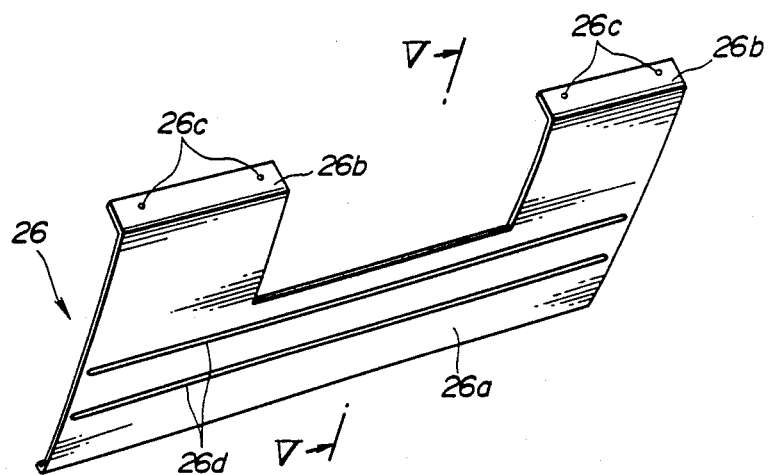
FIG. 3 is a perspective view of the knee protector of FIG. 1.
Figure 4:
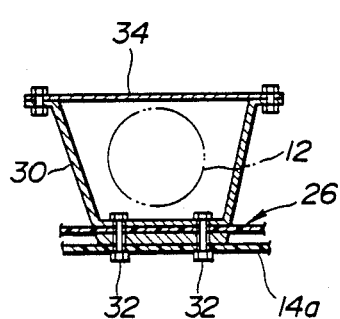
FIG. 4 is a section view of a supporting member taken along the line IV—IV of FIG. 1.

As can be seen clearly from FIG. 3, the knee protector 26 comprises an essentially U-shaped knee protector body 26a, and a pair of flange portions 26b which extend from the upper ends of the knee protector body 26a essentially perpendicularly thereto. A plurality of openings 26c are formed in the flange portions 26b. The knee protector 26 is arranged at a location neighboring the steering column 12. The flange portions 26b of the knee protector 26 are fixed to an inwardly extending flange portion 14b of the instrument panel 14 by means of a plurality of screws 28 passing through the openings 26c. On the other hand, the lower portion of the knee protector 26 together with the lower panel 14a of the instrument panel 14 are secured to a supporting member 30 by means of a pair of screws 32. As can be seen clearly from FIG. 4, the supporting member 30 has an essentially U-shaped cross section, and defines a space through which the steering column passes. The supporting member 30 is fixed to a supporting stay 34 extending from the lower panel 16.

Figure 5:
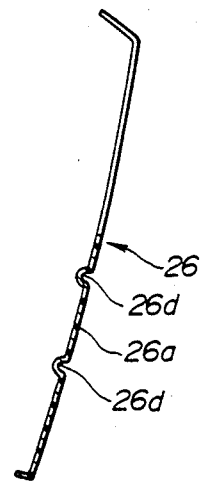
FIG. 5 is a section view of the knee protector taken along the line V—V of FIG. 3.

As shown in FIGS. 3 and 5, a plurality of grooves 26d, which have essentially U-shaped cross section and which extend essentially perpendicularly to the steering column 12 in the lateral direction of the vehicle body, are formed in the knee protector body 26a. The grooves 26d function as reinforcement ribs which assure the knee protector 26 a predetermined degree of rigidity. The grooves 26d also serve to make deformation of the knee protector body easy when a load applied to the steering wheel 10 in the direction of the axis of the steering column.

As set forth above, the knee protector 26 is arranged under the steering column 12 at a location neighboring the steering column 12. Therefore, the lower panel 14a of the instrument panel 14 can be arranged near the steering column 12, so that a space between the lower panel 14a and the driver's knees can be relatively large.

When the vehicle is violently stopped, the driver's knees W strike against the knee protector body 26a via the lower panel 14a of the instrument panel 14. At this time, the knee protector body 26a is deformed absorbing energy applied thereto by the knees W of the occupant so as to prevent them from being injured.

In addition, when a load F is applied to the steering wheel 10 by a car crush, the mounting bracket 18 is detached from the mounting portion 20a of the steering member 20 along the steering column 12. In this case, if the mounting bracket 18 is brought into contact with the knee protector body 26a, the body 26a is deformed as shown by the dotted line of FIG. 1, so that the mounting bracket 18 can be smoothly detached from the mounting portion 20a. As a result, the steering column 12 can effectively absorb collision energy applied to the steering wheel 10, so that it is possible to prevent the driver's breast from being injured.

What is claimed is:

1. A knee protector for use in an automotive vehicle equipped with an instrument panel and a steering column which detaches from a mounting portion so as to absorb energy applied to the steering wheel, comprising:

a knee protector body which is arranged between the steering column and the instrument panel and is fixed to the instrument panel, said knee protector body being arranged beneath and at a location adjacent to the steering column so as to provide a sufficient amount of space under the steering column for the vehicular driver's legs, said knee protector body being deformable to absorb kinetic energy due to a car crush so that a load applied to the driver's knee is restricted to be within a predetermined limit when the knees strike against the instrument panel in the car crush; and means for reinforcing said knee protector body and for making deformation of said knee protector body easy so as to assure smooth detachment of the steering column, when a load is applied to said steering wheel in the direction of the axis of said steering column.

2. A knee protector as set forth in claim 1, wherein said means comprises a plurality of recessed portions formed in one surface of said knee protector body, said recessed portions projecting from the opposite surface of said knee protector body and extending in a direction essentially perpendicular to said steering column.

3. A knee protector as set forth in claim 2, wherein said knee protector body is made of a material which is deformable so as to absorb impact energy when impact force is applied to said knee protector body.

* * * * *